United States Patent [19]

Nighswonger

[11] Patent Number: 4,570,509
[45] Date of Patent: Feb. 18, 1986

[54] DIFFERENTIAL LOCK CONTROL SYSTEM RESPONSIVE TO STEERING AND/OR BRAKING ACTION TO UNLOCK DIFFERENTIAL

[75] Inventor: Lester L. Nighswonger, Cedar Falls, Iowa

[73] Assignee: Deere & Company, Moline, Ill.

[21] Appl. No.: 503,969

[22] Filed: Jun. 13, 1983

[51] Int. Cl.[4] ............................................. F16H 1/445
[52] U.S. Cl. ..................................... 74/710.5; 74/713
[58] Field of Search ...................... 74/710, 710.5, 711, 74/713, 752 A, 752 C, 752 D, 866; 192/4 A

[56] References Cited

U.S. PATENT DOCUMENTS

| | | | |
|---|---|---|---|
| 2,722,134 | 11/1955 | Cabell | 74/472 |
| 2,803,150 | 8/1957 | Fisher | 74/710.5 |
| 2,830,670 | 4/1958 | Ferguson | 74/710.5 X |
| 2,874,790 | 2/1959 | Hennessey | 180/6.2 |
| 2,934,975 | 5/1960 | Algie | 74/650 |
| 3,292,720 | 12/1966 | Harvey | 180/6.2 |
| 3,400,610 | 9/1968 | Taylor et al. | 74/710.5 |
| 3,446,320 | 5/1969 | Schott | 192/4 |
| 3,463,277 | 8/1969 | Allori et al. | 192/4 |
| 3,467,212 | 9/1969 | Doll | 180/6.2 |
| 3,498,427 | 3/1970 | Bingley | 192/13 |
| 3,640,360 | 2/1972 | Dollase | 192/4 A |
| 3,642,103 | 2/1972 | Schott | 192/4 A |
| 3,732,752 | 5/1973 | Louckes et al. | 74/710.5 |
| 3,788,166 | 1/1974 | Hart et al. | 74/710.5 |
| 3,871,249 | 3/1975 | Jeffers | 74/711 |
| 3,945,475 | 3/1976 | Khatti | 74/710.5 X |
| 4,113,044 | 9/1978 | Williams et al. | 74/710.5 X |
| 4,218,938 | 8/1980 | Hattori | 74/710.5 |
| 4,347,760 | 9/1982 | Jewett | 74/710.5 |

Primary Examiner—Leslie A. Braun
Assistant Examiner—Dwight G. Diehl

[57] ABSTRACT

A farm tractor includes differentials interposed in the front and rear axles of an agricultural vehicle. The differentials include hydraulically-operated locks each controlled by a solenoid-operated valve. The solenoid valves are controlled by a control circuit which includes a latching relay, a normally open manual switch operable only to close the relay and lock the differential and a pair of series-connected, normally closed switches which are operable only to unlock the differential in response to vehicle steering or braking operation.

1 Claim, 1 Drawing Figure

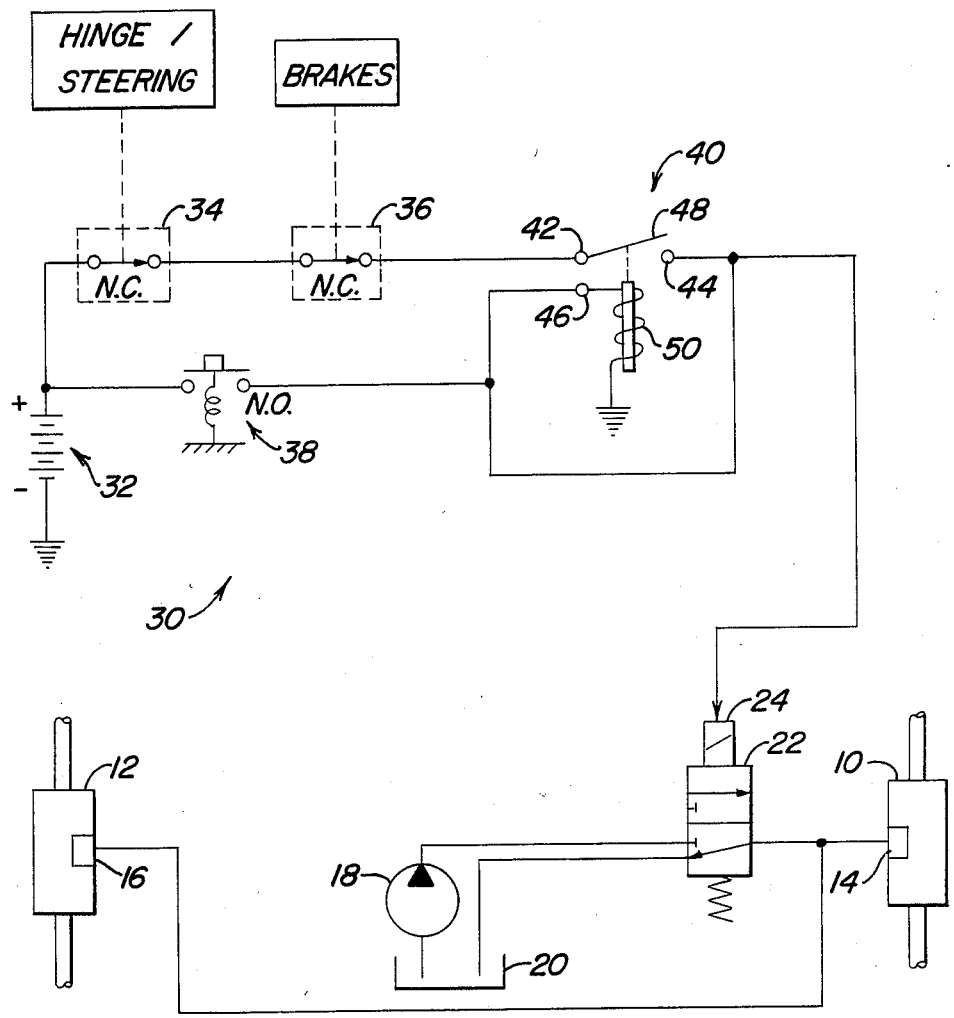

DIFFERENTIAL LOCK CONTROL SYSTEM RESPONSIVE TO STEERING AND/OR BRAKING ACTION TO UNLOCK DIFFERENTIAL

BACKGROND OF THE INVENTION

This invention relates to a control system which controls the locking and unlocking of a differential gear mechanism. It is well known to provide vehicles, such as farm tractors, with differentials which can be selectively locked or unlocked. In a simple form, differential lock control systems are in use wherein a solenoid-operated differential lock control valve is controlled by a single, manually-operated floor switch. However, with such a system, the vehicle operator must continuously depress the floor switch in order to keep the differential locked. It is also well known that it is desirable to have the differential automatically unlocked under certain conditions, such as when steering the vehicle or when applying the brakes in anticipation of or in order to facilitate vehicle turning. One patent that teaches a control system for unlocking a differential in response to steering of the vehicle in U.S. Pat. No. 2,874,740. This patent further teaches unlocking and locking the differential in response to operation of an ignition switch and in response to brake application. To accomplish these results, a differential lock mechanism is controlled by a plurality of series-connected switches. One disadvantage of such a circuit is that after the differential has been unlocked, as a result of a braking or steering operation, the differential will automatically be re-locked when these operations are terminated without the operator making a conscious decision to re-lock the differential. A further disadvantage is that the circuit includes a manual switch which can be toggled to both unlock and lock the differential. Another differential control circuit is described in U.S. Pat. No. 4,347,760. This circuit includes (in part) a flip-flop and a manual floor switch. However, successive application of this floor switch will alternately lock and unlock the differential. Thus, with this dual function floor switch, there is the possibility that the operator can toggle these manual switches with the intention of unlocking the differential, wherein such a toggling would actually lock the differential and vice-versa.

Additional differential control circuits are described in U.S. Pat. No. 3,732,752. However, one embodiment described therein also includes such a dual-function manual switch. The other embodiment includes a latching relay and a momentary contact switch operable only to lock the differential. However, this last embodiment apparently has no direct manual controlled means for unlocking the differential, nor is there provided any means for unlatching the relay after it is latched, thus making the momentary contact switch useless after its first operation and thus, causing a permanent power drain on the vehicle electrical system.

SUMMARY OF THE INVENTION

An object of the present invention is to provide a differential lock control system with one set of operator-controlled devices which are operable only to lock the differential and with another set of operator-controlled devices which are operable only to unlock the differential.

Another object of the present invention is to provide a differential lock control system wherein the differential is automatically unlocked in response to steering or braking.

These and other objects are achieved by the present invention which includes differentials interposed in the front and rear axles of an agricultural vehicle. The differentials include hydraulically-operated locks, each controlled by a solenoid-operated valve. The solenoid valves are controlled by a control circuit which includes a latching relay, a normally open manual switch operable only to close the relay and lock the differential and a pair of series-connected, normally closed switches which are operable only to unlock the differential in response to vehicle steering or braking operation.

BRIEF DESCRIPTION OF THE DRAWING

The FIGURE is a schematic diagram of a differential lock control system constructed according to the present invention.

DETAILED DESCRIPTION

The power train of a four-wheel drive vehicle includes front and rear axle conventional differential mechanisms 10 and 12 (interposed in the front and rear axles) with conventional, hydraulically-operated locking mechanisms 14 and 16, such as described in U.S. Pat. No. 3,292,720. Fluid communication between the locks 14 and 16 and pump 18 and a reservoir 20 is controlled by a conventional solenoid-operated 2-way, 2-position valve 22 with solenoid 24.

The control circuit 30 includes a potential source or battery 32, a series-connected pair of normally closed switches 34 and 36, a normally open momentary contact switch 38 and a conventional latching relay 40. Switches 34 and 36 are coupled between the battery 32 and a first terminal 42 of the relay 40. The second relay terminal 44 is coupled to the solenoid of valve 22, to one side of normally open switch 38 and to the third or coil or latch terminal 46 of relay 40. A switch 48 bridges terminals 42 and 44 and is operated by the relay coil 50.

If the vehicle (not shown) is of the articulated variety, then switch 34 will preferably be operatively coupled to the vehicle hinge (not shown) so that switch 34 opens whenever the vehicle articulates at least a certain amount, such as 10 degrees. The particular design of such an angle-sensitive switch is believed to be evident to one with ordinary skill in the art. For example, the switch mechanism shown in FIG. 3 of U.S. Pat. No. 2,874,790 could be easily adapted for use with the hinge of an articulated vehicle.

For a non-articulated vehicle, the switch 34 would preferably be operatively coupled to the vehicle steering system 50 so that switch 34 opens whenever a predetermined steering operation is performed, such as at least a 10 degree turn of the steering wheel. This could be accomplished with an appropriately shaped cam which turns with the steering wheel and a follower coupled to the switch 34. Alternatively, a steering-operated switch mechanism, such as described in U.S. Pat. No. 2,874,790 could be used.

Switch 36 is preferably operatively coupled to the vehicle brake system so that switch 36 opens whenever the vehicle brakes are applied. Such a brake-operated switch is well known and is also described in U.S. Pat. No. 2,874,740. Switch 38 is also preferably mounted in the vehicle operator's compartment so as to be easily accessible to the vehicle operator.

MODE OF OPERATION

To lock up or engage the lock mechanisms 14 and 16 of differentials 10 and 12 (assuming relay 40 is initially open), the operator momentarily closes switch 38. This simultaneously energizes the solenoid of valve 22 and engages locks 14 and 16 while also energizing coil 50 of relay 40 which closes the switch 48. The coil 50 is now also energized via switches 34, 36 and 48, so that when switch 38 is released and opened, the coil 50 remains energized and switch 48 is latched in the closed position and the differential locks 14 and 16 remain engaged. At this point, further and successive operations of switch 38 have no effect since the solenoid 24 is energized independent of switch 38 via switches 34, 36 and 48.

Now, a hinge movement or steering operation, or a brake application will open either of switches 34 or 36 and thus, de-energize solenoid 24. This also de-energizes coil 50 which opens switch 48. Switch 48 will remain open so that reclosings or further and successive operations of switches 34 and 36 will no re-engage the differential locks 14 and 16. Thus, switch 38 is operable only to engage but not disengage the differential locks 14 and 16, while switches 34 and 36 are operable only to disengage, but not to engage or re-engage the differential locks 14 and 16. In this manner, once switches 34 or 36 have been opened, the differential locks 14 and 16 can be re-engaged only if the operator intentionally closes switch 38.

While the invention has been described in conjunction with a specific embodiment, is to be understood than many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A locking differential control system for a vehicle having first and second axle shafts driven through a differential and locking means for selectively locking and unlocking the differential in response to locking and unlocking signals applied to an input thereof, the control system comprising:

a potential source;

a latching relay having a coil connected between a latch terminal and a grounded terminal and having first and second switch coupled terminals, the latch terminal and one of the switch coupled terminals being connected directly to the input of the locking means, switch means for selectively connecting and disconnecting the first and second terminals with and from each other, the coil opening and closing the switch means in response to signals applied to the latch terminal;

a normally open momentary contact operator-actuated switch coupled on one side to the latch terminal and to the input of the locking means and on its other side to the potential source to initially energize said coil and to activate said relay to position said differential in a locked position; and first and second series-connected, normally closed switches coupled between the potential source and the other of the first and second switch-coupled relay terminals to retain the coil in an energized condition when both said first and second series-connected switches are closed;

means for opening the first normally closed switch in response to a predetermined vehicle steering operation; and means for opening the second normally closed switch in response to a vehicle brake application whereby said coil is deenergized to deactivate said relay to unlock said differential whenever either of said first and second series-connected switches are opened concurrent with said normally open momentary contact switch being open, and the control system generating the locking signal when the potential source is communicated with the input of the locking means and generating the unlocking signal when the potential source is disconnected from the input of the locking means.

* * * * *